United States Patent
Zhang et al.

(10) Patent No.: US 11,645,854 B2
(45) Date of Patent: May 9, 2023

(54) METHOD FOR PROCESSING NAVIGATION DATA, PATH GUIDANCE METHOD, APPARATUS AND STORAGE MEDIUM

(71) Applicant: BAIDU ONLINE NETWORK TECHNOLOGY (BEIJING) CO., LTD., Beijing (CN)

(72) Inventors: Jie Zhang, Beijing (CN); Zhidong Yin, Beijing (CN)

(73) Assignee: BAIDU ONLINE NETWORK TECHNOLOGY (BEIJING) CO., Beijing (CN)

( * ) Notice: Subject to any disclaimer, the term of this patent is extended or adjusted under 35 U.S.C. 154(b) by 277 days.

(21) Appl. No.: 17/112,203

(22) Filed: Dec. 4, 2020

(65) Prior Publication Data

US 2021/0383136 A1 Dec. 9, 2021

(30) Foreign Application Priority Data

Jun. 5, 2020 (CN) .......................... 202010508170.6

(51) Int. Cl.
*B60W 30/12* (2020.01)
*B60W 30/18* (2012.01)
(Continued)

(52) U.S. Cl.
CPC ........... *G06V 20/588* (2022.01); *B60W 30/12* (2013.01); *B60W 30/18163* (2013.01);
(Continued)

(58) Field of Classification Search
CPC .......... B60W 30/12; B60W 30/18163; B60W 2552/10; B60W 2552/53; G01C 21/3629;
(Continued)

(56) References Cited

U.S. PATENT DOCUMENTS

2010/0223002 A1 9/2010 Oonichi et al.
2013/0103304 A1* 4/2013 Nishibashi ....... G08G 1/096827
701/410
(Continued)

FOREIGN PATENT DOCUMENTS

CN 102162734 B 11/2012
CN 108151751 A 6/2018
(Continued)

OTHER PUBLICATIONS

Partial European Search Report received for European Patent Application No. 21164555.1, dated Oct. 18, 2021, 11 pages.
(Continued)

*Primary Examiner* — Abby Y Lin
*Assistant Examiner* — Hossam M Abd El Latif
(74) *Attorney, Agent, or Firm* — Norton Rose Fulbright US LLP; James R. Crawford

(57) ABSTRACT

A method for processing navigation data, a path guidance method, devices, electronic apparatuses, and a storage medium are provided, which are related to a field of autonomous driving technology, and in particular, to a field of advanced assisted driving technology and a field of road navigation technology. The method includes: acquiring attribute information of respective lane lines on a road; dividing the road into multiple lane groups based on a grouping node and a dividing direction, and determining lane relationship information between the lane groups; and setting virtual points corresponding to the respective lane groups, and associating attribute information of a lane line in an $i_{th}$ lane group to an $i_{th}$ virtual point and associating lane relationship information between the $i_{th}$ lane group and an $(i+1)_{th}$ lane group to the $i_{th}$ virtual point.

19 Claims, 10 Drawing Sheets

(51) Int. Cl.
    *G01C 21/00*     (2006.01)
    *G01C 21/34*     (2006.01)
    *G01C 21/36*     (2006.01)
    *G06V 20/56*     (2022.01)

(52) U.S. Cl.
    CPC ..... *G01C 21/3629* (2013.01); *G01C 21/3658* (2013.01); *B60W 2552/10* (2020.02); *B60W 2552/53* (2020.02)

(58) Field of Classification Search
    CPC ............ G01C 21/3658; G01C 21/3815; G01C 21/3415; G01C 21/3614; G01C 21/3617; G01C 21/3644; G01C 21/3602; G06V 20/588
    USPC .......................................................... 701/28
    See application file for complete search history.

(56) References Cited

U.S. PATENT DOCUMENTS

| | | | | |
|---|---|---|---|---|
| 2018/0149488 | A1* | 5/2018 | Suto | G01C 21/3658 |
| 2018/0181091 | A1* | 6/2018 | Funk | G08G 1/133 |
| 2018/0275653 | A1* | 9/2018 | Endo | G05D 1/0022 |
| 2019/0310100 | A1 | 10/2019 | Yang | |
| 2019/0324475 | A1* | 10/2019 | Dean | G01C 21/3446 |
| 2019/0354108 | A1 | 11/2019 | Okajima et al. | |
| 2020/0064846 | A1* | 2/2020 | Chen | G08G 1/096791 |

FOREIGN PATENT DOCUMENTS

| | | | | |
|---|---|---|---|---|
| CN | 108801273 | A | | 11/2018 |
| CN | 109785667 | A | | 5/2019 |
| CN | 110375764 | A | | 10/2019 |
| CN | 108151751 | B * | 4/2020 | ............ G01C 21/30 |
| CN | 110954128 | A | | 4/2020 |
| EP | 1959236 | A1 | | 8/2008 |
| JP | 201887764 | A | | 6/2018 |

OTHER PUBLICATIONS

Extended European Sear Report received for European Patent Application No. 21164555.1 dated Mar. 23, 2022, 11 pages.
Notification to Grant received for Chinese Patent Application No. 202010508170.6 dated Mar. 8, 2022, 6 pages. (English translation).
Office Action received for Japanese Patent Application No. 2021-047747 dated Mar. 16, 2022, 8 pages. (English translation).
Office Action received for Chinese Patent Application No. 2020105081706, dated Jul. 23, 2021, 7 pages. (English translation).
Search Report received for Chinese Patent Application No. 2020105081706, completed on Jul. 16, 2021, 4 pages. (English translation).

* cited by examiner

S201
determining whether there is a target-type lane line on a road on which a vehicle is located according to the data associated with at least one virtual point corresponding to the road

S202
determining a target steering road of the vehicle according to a basic navigation path direction of the vehicle and intersection turning information, if it is determined that there is the target-type lane line

S203
determining whether lanes on both sides of the target-type lane line can lead to the target steering road based on the data associated with the at least one virtual point

S204
generating a guidance activity point which is used for a steering prompt in navigation, if it is determined that a lane on at least one side of the target-type lane line cannot lead to the target steering road

FIG. 7

METHOD FOR PROCESSING NAVIGATION DATA, PATH GUIDANCE METHOD, APPARATUS AND STORAGE MEDIUM

CROSS-REFERENCE TO RELATED APPLICATIONS

This application claims priority to Chinese patent application, No. 202010508170.6, entitled "Method for Processing Navigation Data, Path Guidance Method, Apparatus and Storage Medium", filed with the Chinese Patent Office on Jun. 5, 2020, which is hereby incorporated by reference in its entirety.

TECHNICAL FIELD

The present application relates to a field of autonomous driving technology, in particular, to a field of advanced assisted driving technology and a field of road navigation technology, and more specifically, to a method and a device for processing navigation data, a path guidance method and device, an apparatus, and a storage medium.

BACKGROUND

A navigation product, such as a mobile Application (APP), may provide a road navigation service to a user. Providing such a road navigation service may generally include: finding an optimal path via a path planning algorithm based on city road network data, according to a travelling demand of a user, such as a place of departure or a destination; providing a user with map-based navigation guidance information and/or voice navigation prompt information after a path planning is completed. A user may travel from a place of departure to a destination by referring to the navigation information. With the continuous upgrading, a navigation product may provide a user with more and more information under the premise of completing a basic function of path planning. For example, if it is required to turn at an intersection ahead, a navigation product may prompt a user to enter a turning lane in advance, prompt for a congestion section, an accident-prone section, a speed limit, etc.

As to a road surface condition, traffic lanes, also referred to as lane lines, on a road surface, may guide vehicles to travel in an ordered-diversion manner With an upgrading of road traffic management, the amount and type of traffic lanes on a road surface are gradually increased, and there are more and more restrictions on traffic participants. Thus, it is required to optimize a navigation product.

SUMMARY

A method and device for processing navigation data, a path guidance method and device, an apparatus, and a storage medium are provided according to embodiments of the present application.

According to a first aspect of the present application, a method for processing navigation data is provided. The method includes:

acquiring attribute information of respective lane lines on a road;

dividing the road into multiple lane groups based on a grouping node and a dividing direction, and determining lane relationship information between the lane groups, wherein the grouping node is at a position where an attribute of a lane line changes and the dividing direction is perpendicular to a road axis; and setting virtual points corresponding to the respective lane groups, and associating attribute information of a lane line in an $i_{th}$ lane group to an $i_{th}$ virtual point and associating lane relationship information between the $i_{th}$ lane group and an $(i+1)_{th}$ lane group to the $i_{th}$ virtual point, wherein i is a positive integer, and wherein data associated with the virtual points is used for road navigation.

According to a second aspect of the present application, a path guidance method is provided, which is based on data acquired by using the method for processing navigation data as described above. The path guidance method includes:

determining whether there is a target-type lane line on a road on which a vehicle is located according to the data associated with at least one virtual point corresponding to the road;

determining a target steering road of the vehicle according to a basic navigation path direction of the vehicle and intersection turning information, if it is determined that there is the target-type lane line;

determining whether lanes on both sides of the target-type lane line can lead to the target steering road based on the data associated with the at least one virtual point; and generating a guidance activity point which is used for a steering prompt in navigation, if it is determined that a lane on at least one side of the target-type lane line cannot lead to the target steering road.

According to a third aspect of the present application, a device for processing navigation data is provided. The device includes:

an acquisition module, used to acquire attribute information of respective lane lines on a road;

a group division module, used to divide the road into multiple lane groups based on a grouping node and a dividing direction, and to determine lane relationship information between the lane groups, wherein the grouping node is at a position where an attribute of a lane line changes and the dividing direction is perpendicular to a road axis; and;

an association module, used to set virtual points corresponding to the respective lane groups, and to associate attribute information of a lane line in an $i_{th}$ lane group to an $i_{th}$ virtual point and associate lane relationship information between the $i_{th}$ lane group and an $(i+1)_{th}$ lane group to the $i_{th}$ virtual point, wherein i is a positive integer, and wherein data associated with the virtual points is used for road navigation.

According to a fourth aspect of the present application, a path guidance device is provided, which is based on data acquired by using the method for processing navigation data as described above. The path guidance device includes:

a first determination module, used to determine whether there is a target-type lane line on a road on which a vehicle is located according to the data associated with at least one virtual point corresponding to the road;

a second determination module, used to determine a target steering road of the vehicle according to a basic navigation path direction of the vehicle and intersection turning information, if it is determined that there is the target-type lane line;

a third determination module, used to determine whether lanes on both sides of the target-type lane line can lead to the target steering road based on the data associated with the at least one virtual point; and a generation module, used to generate a guidance activity point which is used for a steering prompt in navigation, if it is determined that a lane on at least one side of the target-type lane line cannot lead to the target steering road.

According to a fifth aspect of the present application, an electronic apparatus is provided. The electronic apparatus includes:

at least one processor; and a memory communicatively connected to the at least one processor, wherein the memory stores instructions executable by the at least one processor, the instructions are executed by the at least one processor to enable the at least one processor to perform the method described above.

According to a sixth aspect of the present application, a non-transitory computer readable storage medium for storing computer instructions is provided. The computer instructions, when executed by a computer, cause the computer to perform the method described above.

By applying the method for processing navigation data according to an embodiment of the present application, a road is divided into multiple lane groups, attribute information of lane lines on a road surface and the like are recorded in a grouping manner. Recorded data may be used to assist a basic navigation system to provide a more accurate navigation prompt, for example, in a road section with special lane lines or with complicated conditions, thereby improving the accuracy of a basic navigation system.

It should be understood that the content described herein is not intended to denote key or critical elements of embodiments of the present application nor to limit the scope of the present application. Further features of the present application may be readily understood from the following description.

BRIEF DESCRIPTION OF THE DRAWINGS

The drawings are used to better understand the scheme and do not constitute a limitation to the present application, wherein:

FIG. 7 shows a flowchart of a path guidance method according to an embodiment of the present application;

DETAILED DESCRIPTION

The exemplary embodiments of the application will be described below in combination with drawings, including various details of the embodiments of the present application to facilitate understanding, which should be considered as exemplary only. Therefore, those of ordinary skill in the art should realize that various changes and modifications can be made to the embodiments described herein without departing from the scope and spirit of the present application. Likewise, descriptions of well-known functions and structures are omitted in the following description for clarity and conciseness. Various embodiments described herein can be implemented in any combination manner, to achieve a basic and/or further beneficial technical effect, as long as they do not contradict with each other.

Figure 1:
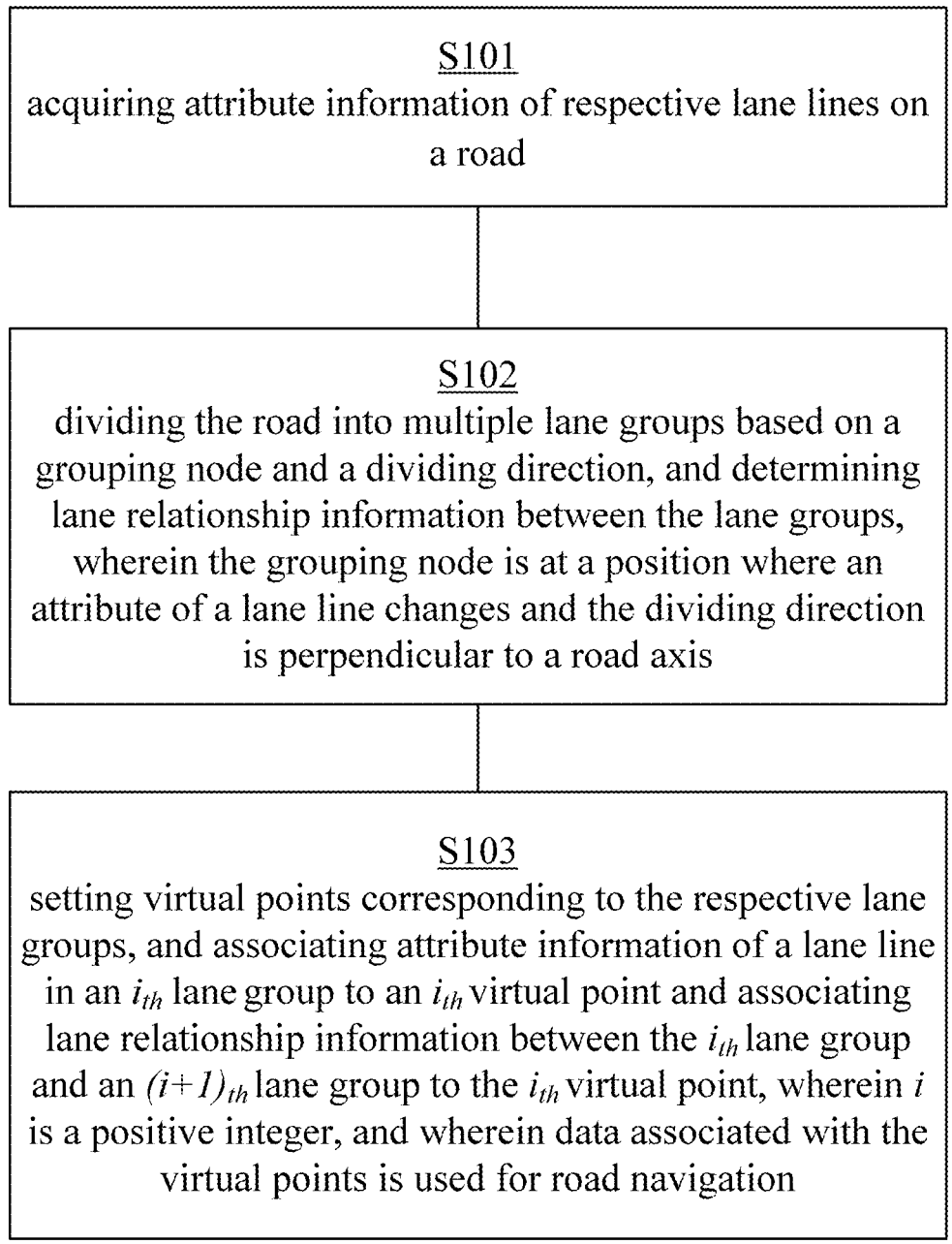
FIG. 1 shows a flowchart of a method for processing navigation data according to an embodiment of the present application.

FIG. 1 shows a flowchart of a method for processing navigation data provided according to an embodiment of the present application. The method includes:

S101, acquiring attribute information of respective lane lines on a road;

S102, dividing the road into multiple lane groups based on a grouping node and a dividing direction, and determining lane relationship information between the lane groups, wherein the grouping node is at a position where an attribute of a lane line changes and the dividing direction is perpendicular to a road axis; and S103, setting virtual points corresponding to the respective lane groups, and associating attribute information of a lane line in an $i_{th}$ lane group to an $i_{th}$ virtual point and associating lane relationship information between the $i_{th}$ lane group and an $(i+1)_{th}$ lane group to the $i_{th}$ virtual point, wherein i is a positive integer, and wherein data associated with the virtual points is used for road navigation.

By applying the method for processing navigation data according to an embodiment of the present application, a road is divided into lane groups, for example, a road may be divided into multiple lane groups, detailed attribute information of lane lines on a road surface and the like are recorded in a grouping manner Recorded data may be used to assist a basic navigation system to provide a more accurate and precise navigation prompt, for example, in a road section with special lane lines or with complicated conditions, thereby improving the preciseness and accuracy of a basic navigation system.

Detailed description of specific implementations of embodiments of the present application is provided in the following various embodiments.

Figure 2:
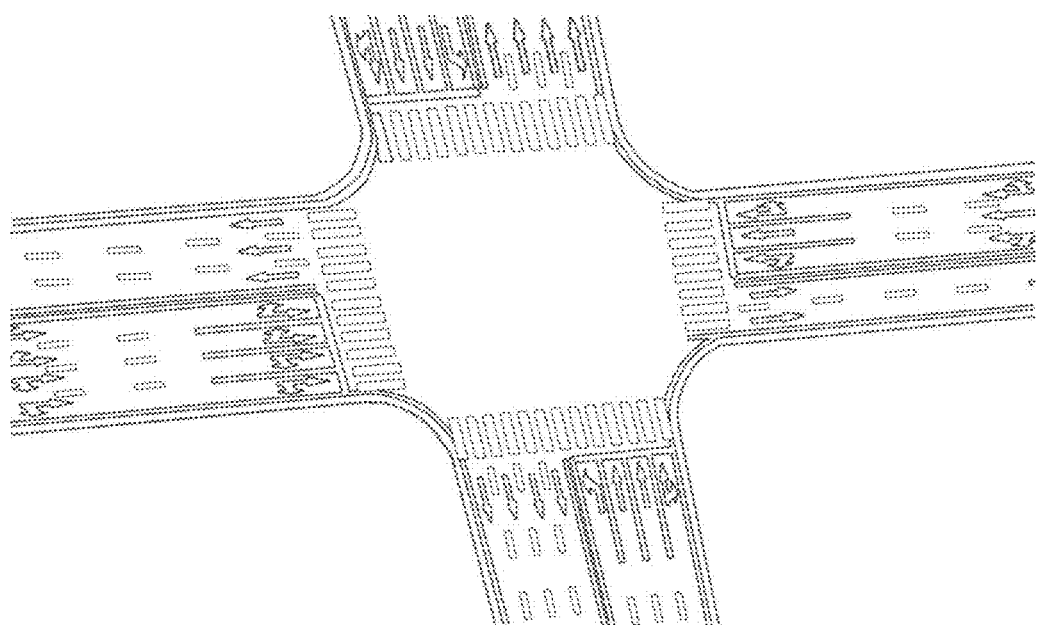
FIG. 2 shows a high-definition schematic top view of roads according to an embodiment of the present application.

To acquire attribute information of a lane line on a road, relevant data may be acquired based on high-precision mapping technology. For example, by extracting a certain number of trajectory images obtained by a high-precision acquisition, high-precision Charge Coupled Device (CCD) camera images, and/or point cloud images, and then performing necessary processing on these images, such as trajectory calculating, coordinate matching, information fusion and/or top view mosaic, etc., a high-precision top view of roads as shown in FIG. 2 may be obtained.

Figure 3:
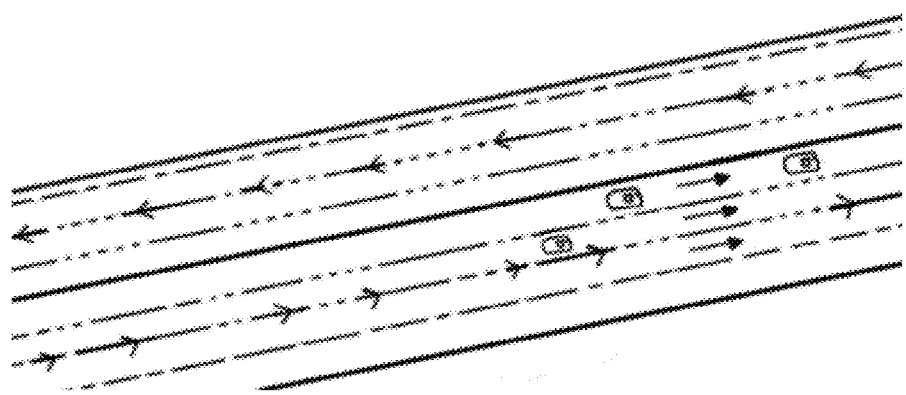
FIG. 3 shows a schematic diagram of an effect of identifying lane lines on a road according to the embodiment of FIG. 2.

In the high-precision top view of roads, a large number of lane lines on a road surface are contained. Information of these lane lines may be obtained by extracting these lane lines with image processing technology. Further, the lane lines may be identified by training an appropriate neutral network model. FIG. 3 shows an effect diagram of a road surface of a road with two-way traffic of the roads in the embodiment of FIG. 2. Traffic orientations are denoted by arrows. The number of lanes with a traffic orientation towards left and the number of lanes with a traffic orientation towards right are 3, respectively. Through training an appropriate neutral network model and inputting a high-precision top view of a road into the model, a lane line may be identified and attribute information of the lane line may be obtained, where the attribute information indicates, for example, the number of lane lines on a road, and the like.

In an embodiment of the present application, attribute information of a lane line may include at least one of: an amount of the lane line, a position of the lane line, a width of the lane line, a length of the lane line, a color of the lane line (e.g., white, yellow, and the like), a category of the lane line (e.g., line separation lines with same travelling directions or with opposite travelling directions, a dedicated lane sideline, a stop line, and the like), a line-type of a lane line (e.g., a broken line, a solid line), a traffic orientation of a lane line, an application type of a lane line (e.g., an ordinary lane, a bus lane, an emergency lane, and the like), restriction information related to a lane line (e.g., travelling time, speed limit, and the like), and a vehicle-travelling arrow of a lane line. In an embodiment of the present application, based on attribute information of lane lines recorded and/or stored, effects of various lane lines may be taken into account during a navigation path planning, thereby providing data information for a lane-level navigation.

In addition, in an embodiment of the present application, lane relationship information between an $i_{th}$ lane group and an $(i+1)_{th}$ lane group includes: a continuation relation, a lane change relation and/or a crossing relation between respective lanes in the $i_{th}$ lane group and in the $(i+1)_{th}$ lane group. For example, as to a certain lane line, it is a broken line in a first lane group, and it turns into a solid lane line when extending to a second lane group. That is, for lanes on both sides of the lane line in the first lane group, an occurrence of a lane change is allowed. However, for lanes on both sides of the lane line in the second lane group, an occurrence of a lane change is not allowed. Information associated with a conversion from "allowing an occurrence of a lane change" to "disallowing an occurrence of a lane change" belongs to lane relationship information between two lane groups.

Attribute information of a lane line on a target road may be acquired via at least one of above methods, to provide a basis for a next group division step. After a road is divided into multiple lane groups, lane relationship information between lane groups may be obtained.

Figure 4:
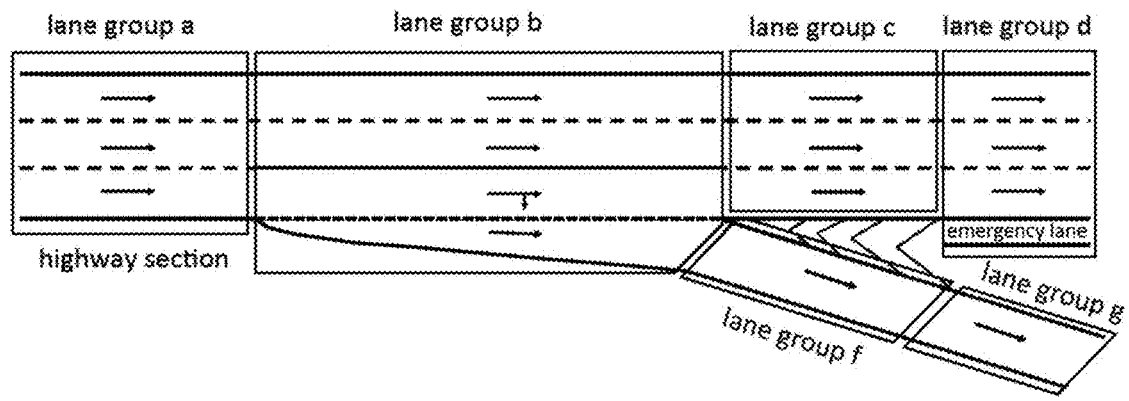
FIG. 4 shows a schematic diagram of an effect of dividing into lane groups according to an embodiment of the present application.

As to the way of a group division of lanes, according to an embodiment of the present application, a road is divided into multiple lane groups based on a grouping node and a dividing direction, where the grouping node is at a position where an attribute of a lane line changes and the dividing direction is perpendicular to a road axis. FIG. 4 shows a schematic diagram of an effect of dividing into lane groups according to an embodiment of the present application. In the embodiment shown in FIG. 4, the section of a road with a bifurcation is divided into six lane groups. In the following, a detailed description is given in conjunction with Table 1 and Table 2.

Table 1 illustrates a way of group division of multiple lanes and related changes of attributes. Taking a position of group division being between a lane group A and a lane group B as an example. Because on the road surface, the number of lanes changes, that is, the road with three lanes changes to the road with four lanes, and there is a long solid line on the road surface, the lane group A and the lane group B may be obtained by taking the position the position where such change occurs as the position of the grouping node and dividing the road in the direction perpendicular to the solid line, where attributes of respective lane lines in the lane group A and in the lane group B themselves do not change.

TABLE 1

| Position of group division | Change of attribute |
| --- | --- |
| Lane group A → Lane group B | Three lanes → four lanes<br>Long solid line occurs |
| Lane group B → Lane group C | One road is divided into two with different exit (drive out) directions<br>Long solid line disappears |
| Lane group B → Lane group F | One road is divided into two with different exit directions<br>Exit from high-speed main line to ramp |
| Lane group C → Lane group E | emergency lane occurs |
| Lane group F → Lane group G | Category of lane changes: from off-ramp to connect-ramp |

Further, according to an embodiment of the present application, it is required to record a forward connection relation of adjacent lane groups, where the "forward" may refer to towards a traffic orientation of a lane line or towards a travelling direction. As shown in FIG. 4, the lane group A connects forwards to the lane group B, and the lane group B bifurcates at its terminal end (including an off-ramp). Therefore, the lane group B connects forwards to the lane group C and the lane group F.

TABLE 2

| Current lane group | Next forwardly connected lane group |
| --- | --- |
| Lane group A | Lane group A → Lane group B |
| Lane group B | Lane group B → Lane group C, and<br>Lane group B → Lane group F |
| Lane group C | Lane group C → Lane group E |
| Lane group F | Lane group F → Lane group G |

According to the foresaid way of group division, attribute of each lane line maintains the same within respective lane groups, however, attribute of each lane line changes between different lane groups. According to an embodiment of the present application, different lane groups are used to demonstrate a change of attributes of lane lines on a road surface, to refine the granularity of an analysis of attribute information of lane lines, which is applicable to autonomous driving technology or advanced assisted driving technology, thereby improving navigation accuracy of a navigation product.

By applying the method for processing navigation data according to an embodiment of the present application, corresponding virtual points are set for respective lane groups, attribute information of a lane line in an $i_{th}$ lane group is associated to an $i_{th}$ virtual point, and lane relationship information between the $i_{th}$ lane group and an $(i+1)_{th}$ lane group is associated to an $i_{th}$ virtual point, where i is a positive integer, and wherein data associated with virtual points is used for road navigation.

For example, multiple lane groups, attribute information of related lane lines and lane relationship information between adjacent lane groups of lanes as illustrated in Table 1, Table 2 and FIG. 4 are stored in virtual dots set correspondingly. When such a dot is triggered, related data may be extracted and used for road navigation, such as for calculating a guidance path by using algorithms, for generating a voice prompt.

In an embodiment of the present application, a link group corresponding to the road is further acquired, and data associated with multiple virtual points corresponding to multiple lane groups is associated to a link group.

In an implementation of the present application, data stored in virtual dots, for example, attribute information of a lane line in the above embodiment is used in conjunction with a basic navigation system, rather than being used independently. Herein, the so-called basic navigation system refers to the following scenario, vehicle-travelling roads in real world are denoted by connecting lines of roads "links", and when a user inputs a starting point/a destination, a navigation system may plan a group of forward travelling links "lines" (which may be referred to as a group of links) and prompt the user of a sequential travelling order in a vertical direction on a path, thereby realizing navigation.

Therefore, lane groups, virtual dots and attribute information of lane lines associated with virtual dots according to embodiments of the present application may be considered as an enhancement of data or function to a basic navigation system. In the following, a relationship between dots in an embodiment of the present application and links related to a basic navigation system, and a processing process is illustrated in detail in conjunction with Table 3, Table 4 and FIG. 5.

Figure 5:
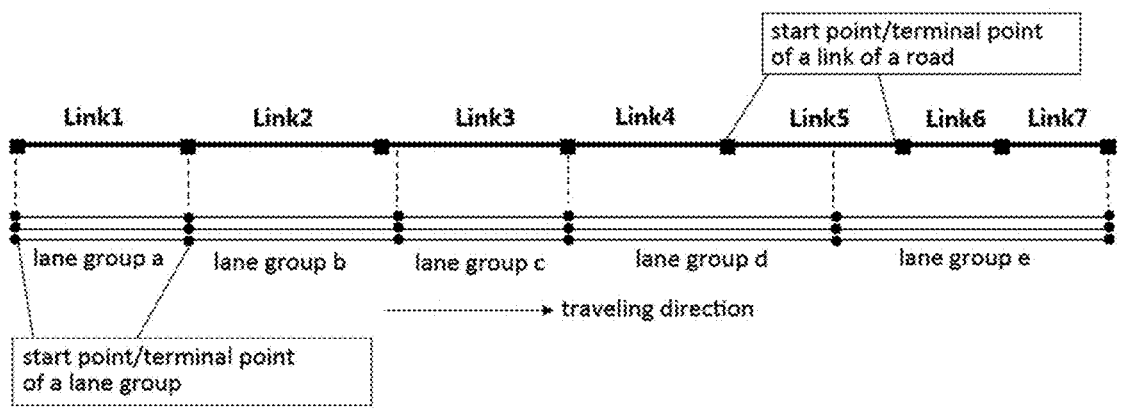
FIG. 5 shows a schematic diagram of an effect of associating lane groups with links according to an embodiment of the present application.

FIG. 5 schematically illustrates multiple links associated with a same road. The links are connected end to end in sequence in the embodiment of FIG. 5. In other embodiments, multiple links may share one starting point based on road topology. In addition, FIG. 5 also shows five lane groups from the lane group A to the lane group E, with three lanes in each lane group.

In Table 3, it is listed: corresponding relationships from lane groups to links along a traveling direction. In Table 4, it is listed: corresponding relationships from links to lane groups along a traveling direction.

TABLE 3

| | List of associated links | |
|---|---|---|
| List of lane groups | Amount of associated links | Sequence number of associated inks |
| Lane group A | One | Link 1 |
| Lane group B | One | Link 2 |
| Lane group C | One | Link 3 |
| Lane group D | Two | Link 4, Link 5 |
| Lane group E | Three | Link 5, Link 6, Link 7 |

TABLE 4

| | List of lane groups associated | |
|---|---|---|
| List of links | Amount of lane groups associated | Sequence number of lane groups associated |
| Link 1 | One | Lane group A |
| Link 2 | One | Lane group B |
| Link 3 | One | Lane group C |
| Link 4 | One | Lane group D |
| Link 5 | Two | Lane group D, Lane group E |

TABLE 4-continued

| | List of lane groups associated | |
|---|---|---|
| List of links | Amount of lane groups associated | Sequence number of lane groups associated |
| Link 6 | One | Lane group E |
| Link 7 | One | Lane group E |

As shown in FIG. 5, in an embodiment of the present application, one lane group may be associated with one or more links, and one link may be associated with one or more lane groups. The association relationships between lane groups and links may be constructed based on a topological relation between actual roads. Here, it refers to a line connecting roads, which is also referred to as a link line, a road link, or a link.

As shown in FIG. 5, in an embodiment of the present application, optionally, a link group includes multiple links, where each of the links has a road node at a start end and a road node at a terminal end (corresponding to a bifurcation, an entry to a road, or an exit of a road, and the like), where the road nodes correspond to starting points and end points of a link, respectively. Multiple links connected end to end constitute a navigation path.

As shown in FIG. 5, in an embodiment of the present application, optionally, along a traveling direction, road nodes at both ends of a link may be taken as a starting point and an end point of the link, and grouping nodes at both ends of a lane group may be taken as a starting point and an end point of the lane group.

Optionally, in an embodiment of the present application, for example, as shown in FIG. 5, data associated with multiple virtual points corresponding to multiple lane groups may be associated with a link group in a following manner: associating data associated with the $i_{th}$ virtual point corresponding to the $i_{th}$ lane group to a road node at a start end of a first link in the link group, wherein the road node at the start end is located at the rear of the $i_{th}$ lane group in a road direction. The road direction refers to a traffic orientation of a lane line or a vehicle-traveling direction, accordingly, the rear may refer to a direction being away from a traffic orientation of a lane line or a vehicle-traveling direction.

Further, as to the way of determining a first link, optionally, an enclosing frame of an $i_{th}$ lane group may be formed by using a lane separation line and a group dividing line in the $i_{th}$ lane group, and a link firstly falling within the enclosing frame of the $i_{th}$ lane group may be taken as the first link. In such a way, it is ensured that the starting point of the link is located at the rare of a lane group.

Through the way above, an association relationship between vehicle-travelling lane lines and road links is established via taking a lane group as a unit. That is, an association relationship between dots of lane groups and road links is established. Based on such a relationship, in the process of providing basic navigation based on road links, data stored in the dots may be integrated into a path planning via basic navigation algorithm, thereby improving the accuracy of navigation.

In an implementation of the present application, a start point of an $i_{th}$ lane group may be projected onto a first link in a direction perpendicular to the first link, to obtain a first projection point. A road node at the start end of the first link is then determined at the rear of the first projection point, and data associated with an $i_{th}$ virtual point is associated to the road node at the start end of the first link.

Further, a distance L between a first projection point and a road node at a start end of a first link may be determined, where the distance L is used for road navigation.

Figure 6:
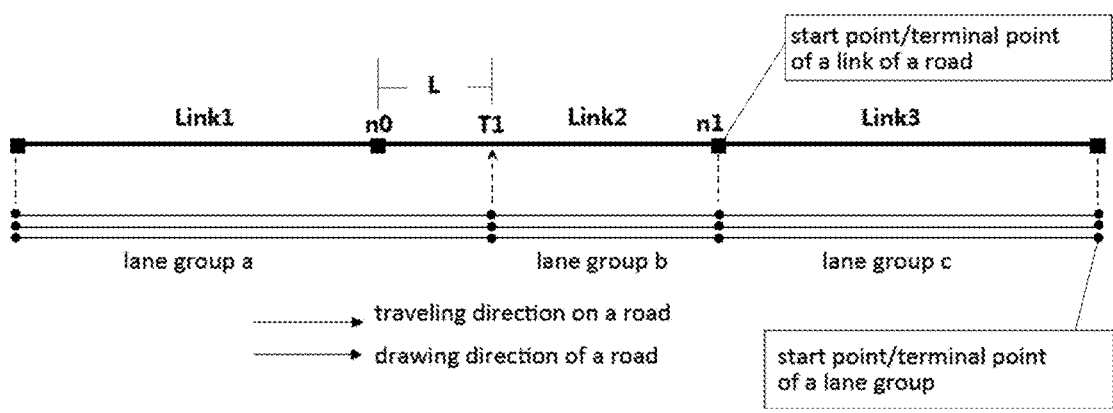
FIG. 6 shows a schematic diagram of an effect of projecting a starting point of a lane group onto a link according to an embodiment of the present application.

As to the way of projection of a starting point of a lane group, FIG. 6 schematically shows an effect diagram of projection according to an embodiment of the present application. Specifically, as shown in FIG. 6 and Table 5, a starting point of a lane group B is projected onto a Link2 (corresponding to the foresaid first link), to obtain a first projection point T1. A road node at the start end of the link2 is determined at the rear of the first projection point T1, that is, the starting point of Link2, n0. Accordingly, an offset distance between the projection point and the starting point of the link may be obtained as L=T1−n0.

TABLE 5

| Sequence number of a lane group | Associated road link | Offset distance of a projection point obtained by projecting a starting point of a lane group onto a road link | |
|---|---|---|---|
| Lane group B | Link2 | Projection point of a lane group: T1 Starting point of an associated link: n0 | Offset distance L = T1 − n0 |

It is noted that, in above embodiment, a road node is located at the rear of an $i_{th}$ lane group, and the first road node is located at the rear of the first projection point. That is, as to a starting point of a lane group and a starting point of a link, between which an association relationship is established, it is necessary to ensure that the starting point of the road link is located at the rear of the starting point of the lane group. Therefore, during a vehicle-traveling, a vehicle may always reach a starting point of a link first, and data associated with a dot corresponding to a lane group ahead may be triggered, thereby enabling the vehicle to acquire information of a special lane line in a lane group ahead in advance (e.g. with a distance of L in advance). As a result, data related to roads in a basic navigation system is enhanced. An optimal path for lane change or changing lanes may be planned for a special lane line, and a special prompt may be made, such as a prompt for changing lanes in advance, to avoid a dilemma of changing lanes on a solid line, thereby providing an accurate navigation service for a driver.

As shown in FIG. 7, in an embodiment of the present application, based on data associated with a virtual dot acquired based on at least one of foresaid embodiments, navigation information may be provided by applying a following path guidance method:

S201, determining whether there is a target-type lane line on a road on which a vehicle is located according to the data associated with at least one virtual point corresponding to the road;

S202, determining a target steering road of the vehicle according to a basic navigation path direction of the vehicle and intersection turning information, if it is determined that there is the target-type lane line;

S203, determining whether lanes on both sides of the target-type lane line can lead to the target steering road based on the data associated with the at least one virtual point; and S204, generating a guidance activity point which is used for a steering prompt in navigation, if it is determined that a lane on at least one side of the target-type lane line cannot lead to the target steering road.

According to an embodiment of the present application, not only basic navigation data may be used, data, such as data including attribute information of a lane line, stored in a dot corresponding to a lane group in front of a vehicle may also be used for road navigation. Therefore, road data is enhanced during a navigation. An optimal path for lane change or changing lanes may be planned for a special lane line in the front, and a special prompt may be made, thereby providing an accurate navigation service for a driver.

In an implementation of the present application, the determining whether there is a target-type lane line on the road on which a vehicle is located according to the data associated with the at least one virtual point corresponding to the road includes:

acquiring, at a first road node of the road, data associated with a virtual point correspond to a lane group in front of the first road node;

determining whether there is a target-type lane line in the lane group according to attribute information of a lane line associated with the virtual point corresponding to the lane group in front of the first road node.

According to an embodiment of the present application, because attribute information of respective lane lines in a lane group is stored in a virtual dot corresponding to the lane group in advance, attribute information of a lane line, such as an amount of a lane line, on a road ahead may be acquired before a corresponding road node is reached, thereby providing data support for a further accurate lane-level navigation.

In an implementation of the present application, the determining whether the lanes on both sides of the target-type lane line can lead to the target steering road based on the data associated with the at least one virtual point includes:

determining whether the lanes on both sides of the target-type lane line can lead to the target steering road, according to the attribute information of the lane line associated with the virtual point corresponding to the lane group in front of the first road node and/or the lane relationship information between the lane groups.

By applying an embodiment of the present application, an unconventional lane/intersection for changing lanes associated with a special marking may be quickly and comprehensively identified in advance, an appropriate lane may be determined from horizontally arranged multi-lanes, and a prompt may be issued when it is required to change lanes in advance, to ensure that a vehicle may avoid any influence of a special lane line, so that the vehicle may successfully enter into a target steering road to complete a lane-level path planning.

In an implementation of the present application, the method for route guidance further includes:

generating a voice prompt information based on the guidance activity point, wherein a position of the guidance activity point is at the rear of a lane group;

playing a voice prompt according to the voice prompt information, when the vehicle is at a basic navigation voice broadcast position within a predetermined range or at the position of the guidance activity point.

By applying the above scheme in an embodiment of the present application, a voice prompt at lane-level may be superimposed onto that of a basic navigation system, to provide an accurate navigation for a user.

In the following, taking a target type lane line of a long solid line as an example, a specific implementation of an embodiment of the present application is described.

At S301, a starting point of a special marking is identified. A retrograde travelling direction calculation is performed according to a position of a bifurcation in navigation data, to find out a dot in the rear of the intersection, and to identify whether there is a special marking such as a long solid line. If there is such a special marking, it may turn to S302. If there exists no such a special marking, it is required to make a record that there is no need to issue a prompt for a special marking at this position.

At S302, according to the dot extracted in S301, a direction matching calculation is performed in conjunction with information related to, such as a traveling direction and an intersection steering arrow, which is specifically as follows.

a) The number of long solid lines in a real road via dots is identified, the identified long solid lines are marked respectively, and calculations are performed one by one.

b) For each long solid line, a calculation on an extension direction of a lane on the left and a lane on the right of each long solid line is performed based on a lane steering arrow. If both lanes may lead to a target steering road, it may be determined that there is no need to generate a special guidance activity point for a current long solid line.

c) If there is no need to generate a special guidance activity point for each long solid line, it may be determined that no guidance activity point is generated at this position. If a lane on at least one side of the long solid line cannot lead to a target steering road, it is required to make a record that a guidance activity point is generated at this position.

At S303, a special guidance activity point is generated by performing a calculation in conjunction with a basic navigation guidance activity point, which is specifically as follows.

a) A special induction point is initially generated. Specifically, an initial broadcast position for special guidance is generated at a position with a certain distance (for example, 200 meters) from a starting point of a long solid line, and a integration calculation is performed based on the initial broadcast position for special guidance and a basic navigation guidance point.

If there exists a basic navigation guidance point within a certain distance (e.g., 100 meters) forwardly or backwards from the initial broadcast position, the initial broadcast position may be integrated into the basic navigation guidance point, and the broadcast position is subject to the basic navigation guidance point. If there exists no basic navigation guidance point within a certain distance (e.g., 100 meters) forwardly or backwards from the initial broadcast position, an independent special guidance broadcast position is generated, and the broadcast position is subject to the initial position.

At S304, when a vehicle with a navigation device travels to a guidance activity point, a special guidance broadcast is triggered, for example, "pay attention to a long solid line, please enter into XX lane in advance". Further, for each intersection, a navigation device may broadcast one or two times.

By applying an embodiment of the present application, a lane-level navigation scheme is determined by calculating whether lanes on both sides of a long solid line may lead to a target steering road, and a voice broadcast prompt is issued, thereby providing an accurate navigation for a user.

Figure 8:
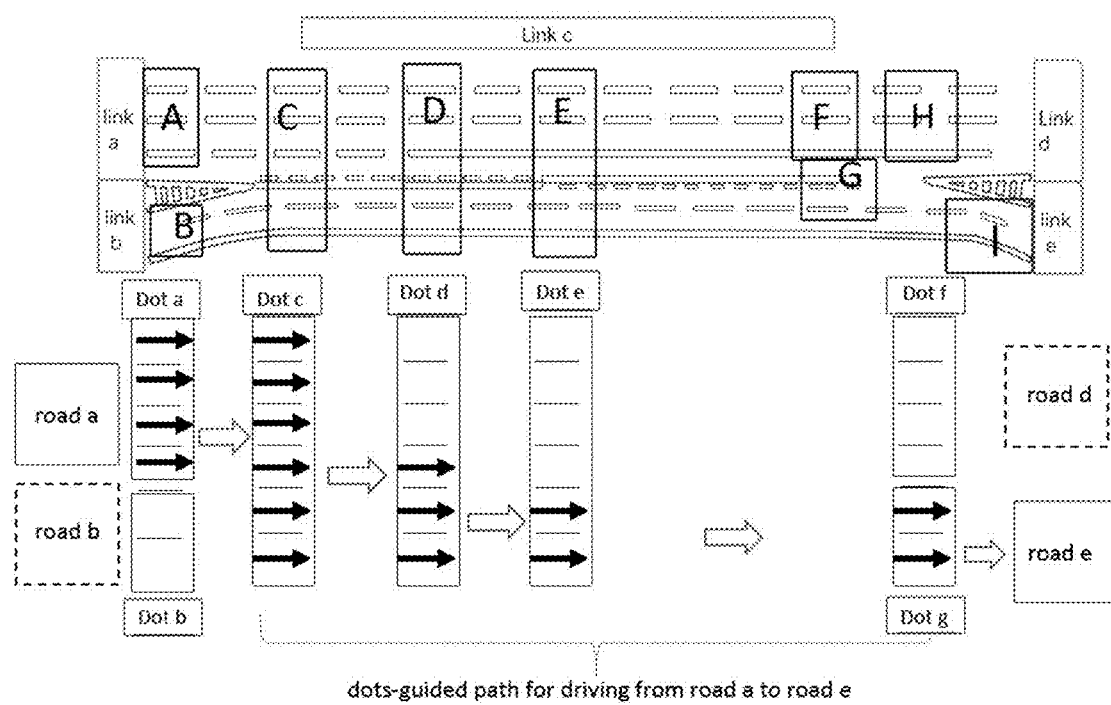
FIG. 8 shows a schematic diagram of a dots-guided path model according to an embodiment of the present application, where the dots correspond to lane groups.

In order to provide a comparable embodiment, FIG. 8 shows a schematic diagram of a dots-guided path model according to an embodiment of the present application, where the dots correspond to lane groups. In FIG. 8, a scene of a road according to an embodiment of the present application is schematically shown. The travelling purpose of a car on the left of FIG. 8 is to drive from link A to link E. In the lower part of FIG. 8, lanes where the car may travel in each road link case (as designated by small arrows) are shown. Further, a certain number of times of lane changes that the car should take to drive from link A to link E (as designated by large arrows) are also shown in FIG. 8.

In conjunction with FIG. 8 and Table 6, it may be seen that the road is divided into nine lanes (from lane A to lane I). In Table 6, attribute information of lane lines associated with nine virtual dots (from dot A to dot I) corresponding to the nine lanes and lane relationship information between adjacent lane groups are listed.

TABLE 6

| dot | Number of lanes extending forwardly | Effect of a special marking in a navigation path | Dot ahead connected | Whether there is a special marking in an interval |
| --- | --- | --- | --- | --- |
| dot A | 4 | Entry point | dot C | No |
| dot B | 2 | Entry point | dot C | No |
| dot C | 6 | Change point | dot D | Yes, broken-cum-solid line |
| dot D | 6 | Change point | dot E | Yes, broken-cum-solid line, long solid line |
| dot E | 6 | Change point | Dot F/ dot G | Yes, broken-cum-solid line, long solid line |
| dot F | 4 | Exit point | dot H | Yes, long solid line |
| dot G | 2 | Exit point | dot I | No |

Figure 9:
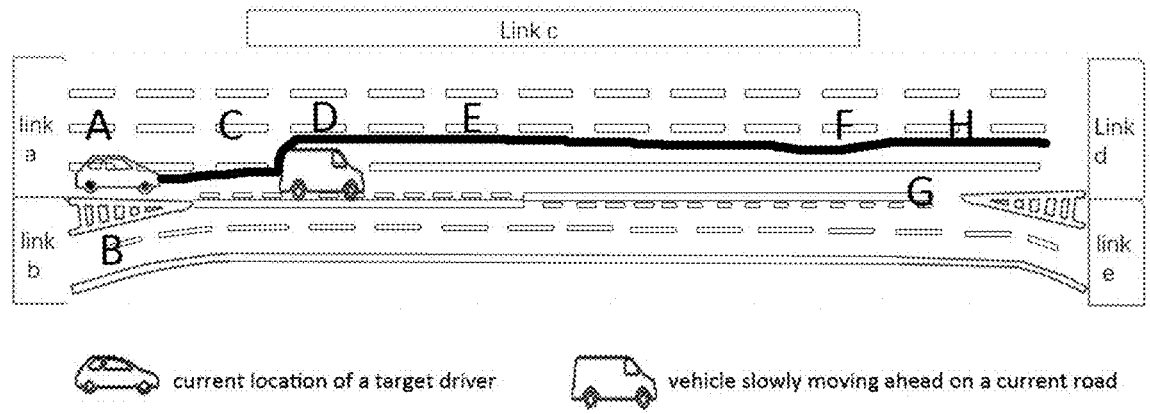
FIG. 9 shows a schematic diagram of a wrong driving route guided by an existing navigation scheme on the road of the embodiment of FIG. 8.

In order to provide a comparison, based on the road shown in FIG. 8, a schematic diagram of a wrong driving route caused by not applying an embodiment of the present application is shown in FIG. 9. Again, based on the road shown in FIG. 8, a schematic diagram of a right driving route guided by a lane-level navigation according to an embodiment of the present application is shown in FIG. 10.

With reference to FIG. 9, for a broken solid line and a long solid line ahead, it is impossible to make a planning in advance by using an existing basic navigation system. Thus, to avoid a vehicle driving slowly on the road ahead, a target driver would overtake from the left side. The navigation system cannot interfere in time, the driver will not be able to drive out from the exit successfully, because there is a long solid line on the road. In this case, the driver may only keep driving and try to find a way out at the next intersection.

Figure 10:
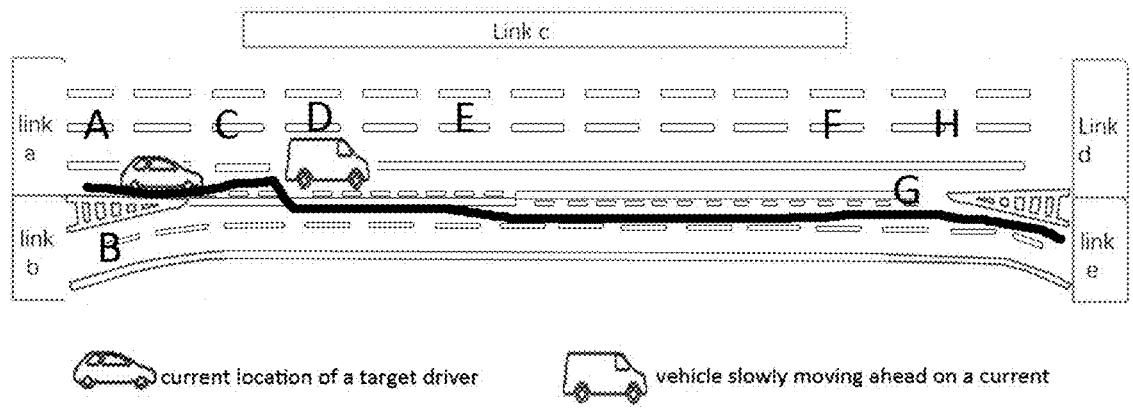
FIG. 10 shows a schematic diagram of a right driving route guided based on an embodiment of the present application on the road of the embodiment of FIG. 8.

With reference to FIG. 10, for a broken solid line and a long solid line ahead, it is possible to make a planning in advance by using a navigation system according to an embodiment of the present application. Based on a navigation path, a reasonable scheme for consecutive driving out may be provided, and a position of a special marking ahead may be emphasized by a repeated voice prompt. Under this circumstance, a target driver will wait patiently and no longer change into a wrong lane when encountering a vehicle driving slowly on the road ahead. The drive will drive to the right gradually as long as it is safe, until reaching the right lane, and then drive out successfully from an exit in the link E. It may be seen that the lane changes and the travelling route under navigation prompts in FIG. 10 are consistent with the model navigation route as shown in FIG. 8, thereby realizing a purpose of accurate lane-level navigation.

Based on an embodiment of the present application, a user's distraction may be reduced during high-speed running, and a clear and definite prompt for changing lanes or for a lane change may be provided to a user. A user may drive into a guided lane at an intersection ahead accurately, thereby realizing a high-definition navigation.

Figure 11:
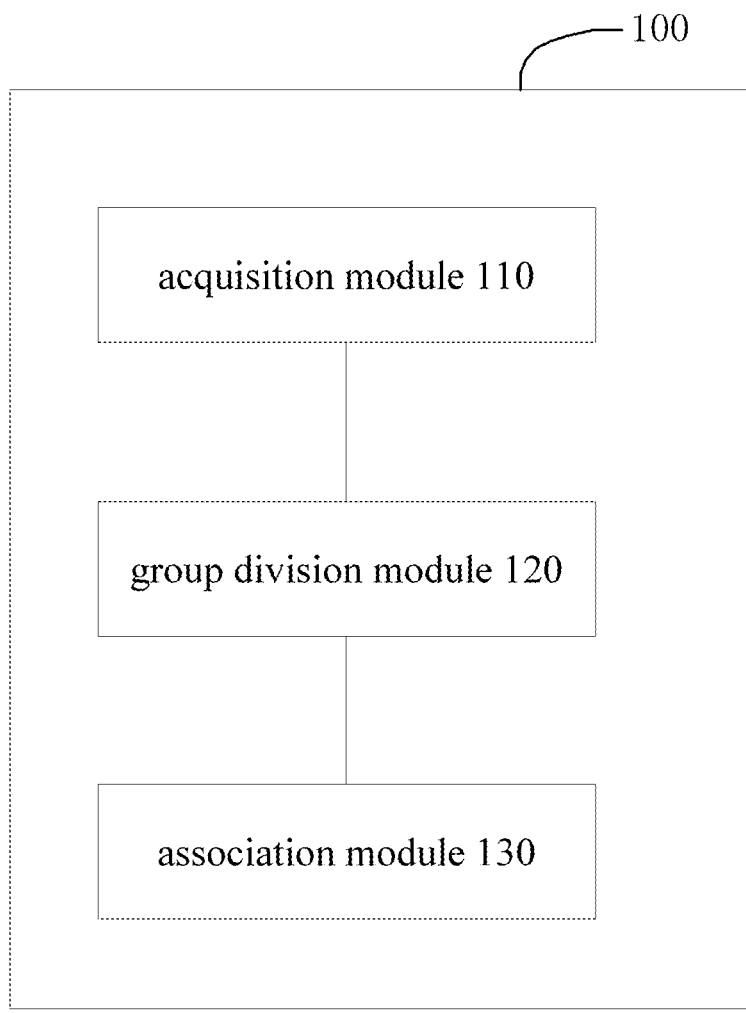
FIG. 11 shows a structural block diagram of a device for processing navigation data according to an embodiment of the present application.

Specific settings and implementations of embodiments of the present application are described above from different angles based on multiple embodiments. Corresponding to the processing method of at least one of the foresaid embodiments, according to an embodiment of the present application, a device for processing navigation data 100 is further provided as shown in FIG. 11. The device includes:

an acquisition module 110, used to acquire attribute information of respective lane lines on a road;

a group division module 120, used to divide the road into multiple lane groups based on a grouping node and a dividing direction, and to determine lane relationship information between the lane groups, wherein the grouping node is at a position where an attribute of a lane line changes and the dividing direction is perpendicular to a road axis;

an association module 130, used to set virtual points corresponding to the respective lane groups, and to associate attribute information of a lane line in an $i_{th}$ lane group to an $i_{th}$ virtual point and associate lane relationship information between the $i_{th}$ lane group and an $(i+1)_{th}$ lane group to the $i_{th}$ virtual point, wherein i is a positive integer, and wherein data associated with the virtual points is used for road navigation.

A device for processing navigation data according to an embodiment of the present application further includes:

a second acquisition module, used to acquire a link group corresponding to the road;

a second association module, used to associate the data associated with the virtual points corresponding to the respective lane groups to the link group.

The device for processing navigation data according to an embodiment of the present application, wherein the link group includes multiple links, wherein each of the links has a road node at a start end of the link and a road node at a terminal end of the link, respectively;

the second association module includes:

a first association submodule, used to associate data associated with the $i_{th}$ virtual point corresponding to the $i_{th}$ lane group to a road node at a start end of a first link in the link group, wherein the road node at the start end is located at the rear of the $i_{th}$ lane group in a road direction.

The device for processing navigation data according to an embodiment of the present application, wherein the first association submodule includes:

a projection unit, used to project a start point of the $i_{th}$ lane group onto the first link in a direction perpendicular to the first link, to obtain a first projection point;

a determination unit, used to determine the road node at the start end of the first link at the rear of the first projection point;

an association unit, used to associate the data associated with the $i_{th}$ virtual point to the road node at the start end of the first link.

The device for processing navigation data according to an embodiment of the present application further includes:

a determination module, used to determine a distance L between the first projection point and the road node at the start end of the first link, wherein the distance L is used for road navigation.

The device for processing navigation data according to an embodiment of the present application further includes:

an enclosing frame processing module, used to form an enclosing frame of the $i_{th}$ lane group by using a lane separation line and a group dividing line in the $i_{th}$ lane group, and take a link firstly falling within the enclosing frame of the $i_{th}$ lane group as the first link.

The device for processing navigation data according to an embodiment of the present application, wherein the attribute information of the lane lines includes at least one of the following: an amount of the lane lines, positions of the lane lines, categories of the lane lines, colors of the lane lines, line-types of the lane lines, widths of the lane lines, traffic orientations of the lane lines, lengths of the lane lines, application types of the lane lines, restriction information related to the lane lines, and vehicle-travelling arrows of the lane lines.

The device for processing navigation data according to an embodiment of the present application, wherein the lane relationship information between the $i_{th}$ lane group and the $(i+1)_{th}$ lane group includes: a continuation relation, a lane change relation and/or a crossing relation between respective lanes in the $i_{th}$ lane group and in the $(i+1)_{th}$ lane group.

Figure 12:
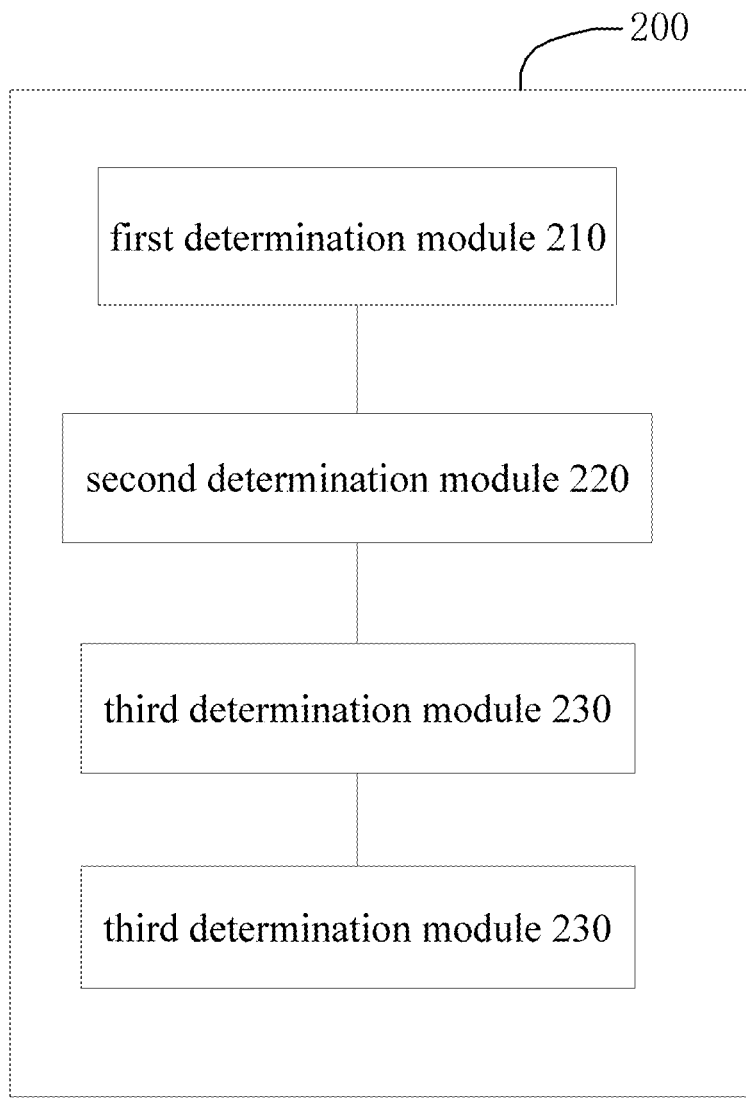
FIG. 12 shows a structural block diagram of a path guidance device according to an embodiment of the present application.

Corresponding to the processing method of at least one of the foresaid embodiments, according to an embodiment of the present application, a path guidance device 200 is further provided as shown in FIG. 12. The path guidance device includes:

a first determination module 210, used to determine whether there is a target-type lane line on a road on which a vehicle is located according to the data associated with at least one virtual point corresponding to the road;

a second determination module 220, used to determine a target steering road of the vehicle according to a basic navigation path direction of the vehicle and intersection turning information, if it is determined that there is the target-type lane line;

a third determination module 230, used to determine whether lanes on both sides of the target-type lane line can lead to the target steering road based on the data associated with the at least one virtual point;

a generation module 240, used to generate a guidance activity point which is used for a steering prompt in navigation, if it is determined that a lane on at least one side of the target-type lane line cannot lead to the target steering road.

The path guidance device according to an embodiment of the present application, where the first determination module includes:

an acquisition submodule, used to acquire, at a first road node of the road, data associated with a virtual point correspond to a lane group in front of the first road node;

a first determination submodule, used to determine whether there is a target-type lane line in the lane group according to attribute information of a lane line associated with the virtual point corresponding to the lane group in front of the first road node.

The path guidance device according to an embodiment of the present application, where the third determination module includes:

a second determination submodule, used to determine whether the lanes on both sides of the target-type lane line can lead to the target steering road, according to the attribute information of the lane line associated with the virtual point corresponding to the lane group in front of the first road node and/or the lane relationship information between the lane groups.

The path guidance device according to an embodiment of the present application further includes:

a generation module, used to generate a voice prompt information based on the guidance activity point, wherein a position of the guidance activity point is at the rear of a lane group;

a playing module, used to play a voice prompt according to the voice prompt information, when the vehicle is at a basic navigation voice broadcast position within a predetermined range or at the position of the guidance activity point.

For functions of modules in devices according to embodiments of the present application, reference may be made to corresponding descriptions of the above method, and thus a detailed description thereof is omitted herein.

Figure 13:
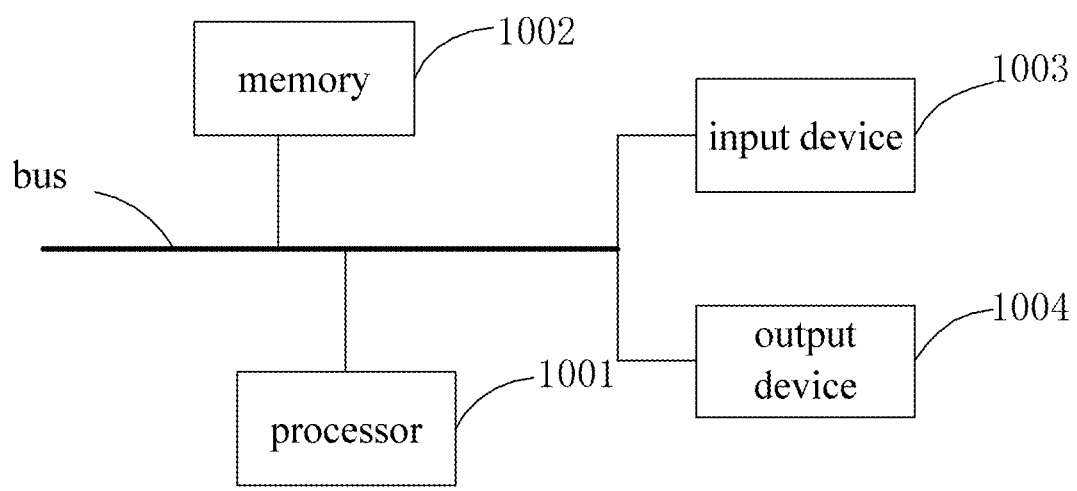
FIG. 13 shows a block diagram of an electronic apparatus for implementing an embodiment of the present application.

According to an embodiment of the present application, an electronic apparatus and a readable storage medium are provided in the present application. As shown in FIG. 13, it is a block diagram showing an electronic apparatus applied with a method according to an embodiment of the present application. The electronic apparatus is intended to represent various forms of digital computers, such as laptop computers, desktop computers, workbenches, personal digital assistants, servers, blade servers, mainframe computers, and other suitable computers. The electronic apparatus may also represent various forms of mobile devices, such as personal digital processors, cellular phones, intelligent phones, wearable devices, and other similar computing devices. Components shown in the present application, their connections and relations, and their functions are merely examples, and are not intended to limit the implementation of the application described and/or required herein.

As shown in FIG. 13, the electronic apparatus includes: one or more processors 1001, a memory 1002, and interfaces for connecting various components, including a high-speed interface and a low-speed interface. The various components are interconnected using different buses and may be mounted on a common motherboard or otherwise installed as required. The processor may process instructions executed within the electronic apparatus, including instructions for storing in or on a memory, to display graphical information of a Graphical User Interface (GUI) on an external input/output device (such as a display device coupled to the interface). In other implementations, multiple processors and/or multiple buses may be used with multiple memories and multiple memories, if desired. Similarly, multiple electronic apparatuses may be connected, each apparatus providing some of the necessary operations (for example, as a server array, a group of blade servers, or a multiprocessor system). In FIG. 13, one processor 1001 is shown as an example.

The memory 1002 is a non-transitory computer-readable storage medium provided in the present application. The memory stores instructions executable by at least one processor, so that the at least one processor executes a method provided in the present application. The non-transitory computer-readable storage medium of the present application stores computer instructions, which are configured to enable a computer to execute a method provided in the present application.

As a non-transitory computer-readable storage medium, the memory 1002 may be used to store non-transitory software programs, non-transitory computer executable programs, and modules, such as program instructions/modules corresponding to a method in embodiments of the present application. The processor 1001 executes various functional applications and data processing of the server by running non-transitory software programs, instructions, and modules stored in the memory 1002, that is, to implement an above method in foregoing method embodiments.

The memory 1002 may include a storage program area and a storage data area, where the storage program area may be used to store an application program required by an operating system or for at least one function; the storage data area may be used to store data created according to the use of an electronic device applied with a method in any one of above embodiments of the present application. In addition, the memory 1002 may include a high-speed random-access memory, and may also include a non-transitory memory, such as at least one magnetic disk storage device, a flash memory device, or other non-transitory solid-state storage device. In some embodiments, the memory 1002 may optionally include a memory set remotely relative to the processor 1001, and these remote memories may be connected to the electronic apparatus applied with a method in any one of above embodiments of the present application through a network. Examples of the above network include, but are not limited to, an Internet, an intranet, a local area network, a mobile communication network, and combinations thereof.

An electronic apparatus applied with a method according to an embodiment of the present application may further include an input device 1003 and an output device 1004. The processor 1001, the memory 1002, the input device 1003, and the output device 1004 may be connected through a bus or in other manners. In FIG. 13, a connection through a bus is shown as an example.

The input device 1003 may receive input numeric or character information, and generate key signal inputs related to a user setting and a function control of an electronic apparatus applied with a method in any one of above embodiments of the present application, such as a touch screen, a keypad, a mouse, a trackpad, a touchpad, a pointing stick, one or more mouse buttons, a trackball, a joystick and other input devices. The output device 1004 may include a display device, an auxiliary lighting device (for example, an LED), a haptic feedback device (for example, a vibration motor), and the like. The display device may include, but is not limited to, a Liquid Crystal Display (LCD), a Light Emitting Diode (LED) display, and a plasma display. In some implementations, the display device may be a touch screen.

Various implementations of the systems and technologies described herein may be implemented in a digital electronic circuit system, an integrated circuit system, an application specific integrated circuit (ASIC), a computer hardware, a firmware, a software, and/or combinations thereof. These various implementations may include: implementations in one or more computer programs, where the one or more computer programs are executable and/or interpretable on a programmable system including at least one programmable processor, programmable processor, where the programmable processor may be a dedicated or general-purpose programmable processor that may receive data and instructions from a storage system, at least one input device, and at least one output device, and may transmit the data and instructions to the storage system, the at least one input device, and the at least one output device.

These computing programs (also known as programs, software, software applications, or codes) include machine instructions of a programmable processor and may be implemented by using a high-level procedural and/or object-oriented programming language, and/or an assembly/machine language. As used herein, the terms "machine-readable medium" and "computer-readable medium" refer to any computer program product, apparatus, and/or device used to provide machine instructions and/or data to a programmable processor (for example, a magnetic disk, an optical disk, a memory, and a programmable logic device (PLD)), including machine-readable media that receives machine instructions as machine-readable signals. The term "machine-readable signal" refers to any signal used to provide machine instructions and/or data to a programmable processor.

In order to provide an interaction with a user, systems and techniques described herein may be implemented on a computer, where the computer includes: a display device (for example, a Cathode Ray Tube (CRT) or liquid crystal display (LCD) monitor) for displaying information to a user; and a keyboard and pointing device (such as a mouse or a trackball) through which a user may provide input to a computer. Other kinds of devices may also be used to provide interaction with a user. For example, a feedback provided to a user may be a sensory feedback in any form (for example, a visual feedback, an auditory feedback, or a haptic feedback), and a user input (including an acoustic input, a voice input, or a tactile input) may be received in any form.

The systems and technologies described herein may be implemented in a computing system including a background component (for example, as a data server), a computing system including a middleware component (for example, an application server), or a computing system including a front-end component (for example, a user computer with a graphical user interface or a web browser, through which the user may interact with an implementation of the systems and technologies described herein), or a computer system including any combination of such a background component, a middleware component, or a front-end component. The components of the system may be interconnected by any form or medium of digital data communication (such as, a communication network). Examples of a communication network include a Local Area Network (LAN), a Wide Area Network (WAN), and the Internet.

It should be understood the steps in the various processes described above may be reordered or omitted, or other steps may be added therein. For example, the steps described in the application may be performed parallelly, sequentially, or in different orders, as long as the desired results of the technical solutions disclosed in the application may be achieved, to which no limitation is made herein.

The embodiments above do not constitute a limitation on the protection scope of the present application. It should be understood by those skilled in the art that various modifications, combinations, sub-combinations, and substitutions may be available according to design requirements and other factors. Any modifications, equivalent replacements and improvements made within the spirit and principle of the present application shall be covered within the protection scope of the present application.

What is claimed is:

1. A method for processing navigation data, comprising:
   acquiring attribute information of respective lane lines on a road;
   dividing the road into multiple lane groups based on a grouping node along a dividing direction, and determining lane relationship information between the lane groups, wherein the grouping node is at a position where an attribute of a lane line changes and the dividing direction is perpendicular to a road axis, and wherein attribute of each lane line maintains the same within each lane group of the multiple lane groups; and
   setting virtual points corresponding to the respective lane groups, wherein a number of the virtual points and a number of the lane groups are same, and an $i_{th}$ virtual point corresponds to an $i_{th}$ lane group, and associating attribute information of a lane line in the $i_{th}$ lane group to the $i_{th}$ virtual point and associating lane relationship information between the $i_{th}$ lane group and an $(i+1)_{th}$ lane group to the $i_{th}$ virtual point, wherein i is a positive integer, and wherein data associated with the virtual points is used for road navigation;
   wherein the method further comprises:
   acquiring a link group corresponding to the road, wherein the link group comprises multiple links which are planned by a navigation system, the multiple links denote vehicle-travelling roads in real world from a starting point to a destination, and each of the multiple links has a road node at a start end of the link and a road node at a terminal end of the link; and
   associating data associated with the $i_{th}$ virtual point corresponding to the $i_{th}$ lane group to a road node at a start end of a first link in the link group, wherein the road node at the start end is located at the rear of the $i_{th}$ lane group in a traveling direction.

2. The method according to claim 1, wherein
   the associating the data associated with the $i_{th}$ virtual point corresponding to the $i_{th}$ lane group to the road node at the start end of the first link in the link group comprises:
   projecting a start point of the $i_{th}$ lane group onto the first link in a direction perpendicular to the first link, to obtain a first projection point, wherein a grouping node on a first side of the $i_{th}$ lane group is the start point of the $i_{th}$ lane group, a grouping node on a second side of the $i_{th}$ lane group is an end point of the $i_{th}$ lane group, and the first side of $i_{th}$ lane group is located at the rear of the second side of the $i_{th}$ lane group in the traveling direction;
   determining the road node at the start end of the first link at the rear of the first projection point in the traveling direction; and
   associating the data associated with the $i_{th}$ virtual point to the road node at the start end of the first link.

3. The method according to claim 2, further comprising:
   determining a distance L between the first projection point and the road node at the start end of the first link, wherein the distance L is used for road navigation.

4. The method according to claim 1, further comprising:
   forming an enclosing frame of the $i_{th}$ lane group by using lane separation lines and group dividing lines in the $i_{th}$ lane group, and taking a link firstly falling within the enclosing frame of the $i_{th}$ lane group as the first link.

5. The method according to claim 1, wherein
   the attribute information of the lane lines comprises at least one of the following: an amount of the lane lines, positions of the lane lines, categories of the lane lines, colors of the lane lines, line-types of the lane lines, widths of the lane lines, traffic orientations of the lane lines, lengths of the lane lines, application types of the lane lines, restriction information related to the lane lines, and vehicle-travelling arrows of the lane lines.

6. The method according to claim 1, wherein
   the lane relationship information between the $i_{th}$ lane group and the $(i_{+}1)_{th}$ lane group comprises: a continuation relation, a lane change relation and/or a crossing relation between respective lanes in the $i_{th}$ lane group and in the $(i+1)_{th}$ lane group.

7. A path guidance method based on data acquired by using the method for processing navigation data according to claim 1, comprising:
   determining whether there is a target-type lane line on a road on which a vehicle is located according to the data associated with at least one virtual point corresponding to the road;

determining a target steering road of the vehicle according to a basic navigation path direction of the vehicle and intersection turning information, if it is determined that there is the target-type lane line;

determining whether lanes on both sides of the target-type lane line can lead to the target steering road based on the data associated with the at least one virtual point; and generating a guidance activity point which is used for a steering prompt in navigation, if it is determined that a lane on at least one side of the target-type lane line cannot lead to the target steering road;

the determining whether there is a target-type lane line on the road on which a vehicle is located according to the data associated with the at least one virtual point corresponding to the road comprises: acquiring, at a first road node of the road, data associated with a virtual point correspond to a lane group in front of the first road node; and determining whether there is a target-type lane line in the lane group according to attribute information of a lane line associated with the virtual point corresponding to the lane group in front of the first road node;

wherein a position of the guidance activity point is at the rear of the lane group in a traveling direction.

8. The path guidance method according to claim 7, wherein the determining whether the lanes on both sides of the target-type lane line can lead to the target steering road based on the data associated with the at least one virtual point comprises:

determining whether the lanes on both sides of the target-type lane line can lead to the target steering road, according to the attribute information of the lane line associated with the virtual point corresponding to the lane group in front of the first road node and/or the lane relationship information between the lane groups.

9. The path guidance method according to claim 7, further comprising:

generating a voice prompt information based on the guidance activity point; and playing a voice prompt according to the voice prompt information, when the vehicle is at a basic navigation voice broadcast position within a predetermined range or at the position of the guidance activity point.

10. A device for processing navigation data, comprising:
at least one processor; and
a memory communicatively connected to the at least one processor, wherein
the memory stores instructions executable by the at least one processor, the instructions are executed by the at least one processor to enable the at least one processor to:
acquire attribute information of respective lane lines on a road;
divide the road into multiple lane groups based on a grouping node along a dividing direction, and to determine lane relationship information between the lane groups, wherein the grouping node is at a position where an attribute of a lane line changes and the dividing direction is perpendicular to a road axis, and wherein attribute of each lane line maintains the same within each lane group of the multiple lane groups; and
set virtual points corresponding to the respective lane groups, wherein a number of the virtual points and a number of the lane groups are same, and an $i_{th}$ virtual point corresponds to an $i_{th}$ lane group, and to associate attribute information of a lane line in the $i_{th}$ lane group to the $i_{th}$ virtual point and associate lane relationship information between the $i_{th}$ lane group and an $(i+1)_{th}$ lane group to the $i_{th}$ virtual point, wherein i is a positive integer, and wherein data associated with the virtual points is used for road navigation;

wherein the method further comprises:
acquiring a link group corresponding to the road, wherein the link group comprises multiple links which are planned by a navigation system, the multiple links denote vehicle-travelling roads in real world from a starting point to a destination, and each of the multiple links has a road node at a start end of the link and a road node at a terminal end of the link; and
associating data associated with the $i_{th}$ virtual point corresponding to the $i_{th}$ lane group to a road node at a start end of a first link in the link group, wherein the road node at the start end is the $i_{th}$ lane group in a traveling direction.

11. The device according to claim 10, wherein
the instructions are executed by the at least one processor to enable the at least one processor to:
project a start point of the $i_{th}$ lane group onto the first link in a direction perpendicular to the first link, to obtain a first projection point, wherein a grouping node on a first side of the $i_{th}$ lane group is the start point of the $i_{th}$ lane group, a grouping node on a second side of the $i_{th}$ lane group is an end point of the $i_{th}$ lane group, and the first side of $i_{th}$ lane group is located at the rear of the second side of the $i_{th}$ lane group in the traveling direction;
determine the road node at the start end of the first link at the rear of the first projection point in the traveling direction; and
associate the data associated with the $i_{th}$ virtual point to the road node at the start end of the first link.

12. The device according to claim 11, wherein the instructions are executed by the at least one processor to enable the at least one processor to:
determine a distance L between the first projection point and the road node at the start end of the first link, wherein the distance L is used for road navigation.

13. The device according to claim 10, wherein the instructions are executed by the at least one processor to enable the at least one processor to:
form an enclosing frame of the $i_{th}$ lane group by using a-lane separation lines and a group dividing lines in the $i_{th}$ lane group, and take a link firstly falling within the enclosing frame of the $i_{th}$ lane group as the first link.

14. The device according to claim 10, wherein
the attribute information of the lane lines comprises at least one of the following: an amount of the lane lines, positions of the lane lines, categories of the lane lines, colors of the lane lines, line-types of the lane lines, widths of the lane lines, traffic orientations of the lane lines, lengths of the lane lines, application types of the lane lines, restriction information related to the lane lines, and vehicle-travelling arrows of the lane lines.

15. The device according to claim 10, wherein
the lane relationship information between the $i_{th}$ lane group and the $(i_+1)_{th}$ lane group comprises: a continuation relation, a lane change relation and/or a crossing relation between respective lanes in the $i_{th}$ lane group and in the $(i+1)_{th}$ lane group.

16. A path guidance device based on data acquired by using the method for processing navigation data according to claim 1, comprising:

at least one processor; and a memory communicatively connected to the at least one processor, wherein the memory stores instructions executable by the at least one processor, the instructions are executed by the at least one processor to enable the at least one processor to:

determine whether there is a target-type lane line on a road on which a vehicle is located according to the data associated with at least one virtual point corresponding to the road;

determine a target steering road of the vehicle according to a basic navigation path direction of the vehicle and intersection turning information, if it is determined that there is the target-type lane line;

determine whether lanes on both sides of the target-type lane line can lead to the target steering road based on the data associated with the at least one virtual point; and generate a guidance activity point which is used for a steering prompt in navigation, if it is determined that a lane on at least one side of the target-type lane line cannot lead to the target steering road;

wherein the instructions are executed by the at least one processor to enable the at least one processor to:

acquire, at a first road node of the road, data associated with a virtual point correspond to a lane group in front of the first road node; and determine whether there is a target-type lane line in the lane group according to attribute information of a lane line associated with the virtual point corresponding to the lane group in front of the first road node;

wherein a position of the guidance activity point is at the rear of the lane group in a traveling direction.

17. The device according to claim 16, wherein the instructions are executed by the at least one processor to enable the at least one processor to:

determine whether the lanes on both sides of the target-type lane line can lead to the target steering road, according to the attribute information of the lane line associated with the virtual point corresponding to the lane group in front of the first road node and/or the lane relationship information between the lane groups.

18. The device according to claim 16, wherein the instructions are executed by the at least one processor to enable the at least one processor to:

generate a voice prompt information based on the guidance activity point; and play a voice prompt according to the voice prompt information, when the vehicle is at a basic navigation voice broadcast position within a predetermined range or at the position of the guidance activity point.

19. A non-transitory computer-readable storage medium for storing computer instructions, wherein the computer instructions, when executed by a computer, cause the computer to implement the method claim 1.

* * * * *